United States Patent [19]

Nakamura et al.

[11] Patent Number: 4,804,590
[45] Date of Patent: Feb. 14, 1989

[54] ABRASION RESISTANT MAGNETIC RECORDING MEMBER

[75] Inventors: Kyuzo Nakamura; Yoshifumi Ota, both of Yachimata; Taiki Yamada, Narita; Michio Ishikawa; Noriaki Tani, both of Yachimata, all of Japan

[73] Assignee: Nihon Shinku Gijutsu Kabushiki Kaisha, Kanagawa, Japan

[21] Appl. No.: 934,594

[22] Filed: Nov. 25, 1986

[30] Foreign Application Priority Data

Feb. 6, 1986 [JP] Japan ............................ 61-22979
May 26, 1986 [JP] Japan ........................... 61-119108

[51] Int. Cl.$^4$ ............................................. G11B 5/72
[52] U.S. Cl. .................................. 428/408; 427/131; 428/694; 428/695; 428/900
[58] Field of Search ............ 428/408, 694, 695, 900; 427/131

[56] References Cited

U.S. PATENT DOCUMENTS

| | | |
|---|---|---|
| 4,382,100 | 5/1983 | Holland . |
| 4,411,963 | 10/1983 | Aine ..................................... 427/131 |
| 4,503,125 | 3/1985 | Nelsm et al. ....................... 427/131 |
| 4,636,435 | 1/1987 | Yanagihara et al. ................ 427/131 |
| 4,647,494 | 3/1987 | Meyerson et al. .................. 428/695 |

OTHER PUBLICATIONS

W. T. Maloney, "RF-Sputtered Chromium-Cobalt Films for High-Density Longitudinal Magnetic Recording" IEEE Transactions on Magnetics, vol. MAG-15, No. 6, Nov. 1979, pp. 1546-1548.

*Primary Examiner*—Paul J. Thibodeau
*Attorney, Agent, or Firm*—Armstrong, Nikaido, Marmelstein & Kubovcik

[57] ABSTRACT

An abrasion resistant magnetic recording member having a carbonaceous surficial protective film for protecting a surface of a magnetic film formed on a substrate, and the carbonaceous surficial protective film is formed of a lower layer comprising a comparatively hard carbonaceous film and an upper layer comprising a comparatively soft carbonaceous film.

8 Claims, 1 Drawing Sheet

ABRASION RESISTANT MAGNETIC RECORDING MEMBER

BACKGROUND OF THE INVENTION

1. Field of the Invention

This invention relates to an abrasion resistant magnetic recording member.

2. Description of Relevant Information

Hitherto, there have been known various abrasion resistant magnetic recording members prepared by various methods by which a magnetic substance deposited film made of such as magnetic metals, metal oxides, metal nitrides as Co, Fe, Co-Ni, Co-Ni-Cr, Co-Ni-P, $\gamma Fe_2O_3$, Co-Cr, Co-Ni-Pt Fe-N, etc. and is formed on a surface of a nonmagnetic substrate made of Al, plastic film, NiP plated Al, alumite, glass, or other similar materials, in the form of a disk, a tape and so on. This may be accomplished by a sputtering process, a vapor deposition process, a plating process, etc. and A layer of magnetic film is formed on the surface of the substrate as a carbonaceous surfacial protective film, among the possibilities are a) an amorphous carbon film prepared by a sputtering process using a graphic target (which is called thereafter "a sputter carbon film") or b) a carbonaceous film (called "a PCVD carbonaceous film") composed of such a carbonaceous series of a C—C type, a C—C type including C-H chains, or polymeric type prepared by a plasma enhansed CVD (PCVD) process using such a gas as a hydrocarbon gas, (which is called thereafter "PCVD carbonaceous film") or c) a vapor deposition film prepared by vaporizing and depositing carbons by an arc discharge.

The foregoing conventional abrasion resistant magnetic members have certain defects mentioned below. Namely, as shown in FIG. 1, a recording member having a sputter carbon film shows an excellent abrasion resistance to a monolithic head of Mn.Zn ferrite. However, it is disadvantageous in that during its application to a composite type head or a thin coated type head for a high dense recording (a head using as a slider such a hard ceramic material as $CaTiO_3$ or $Al_2O_3$.TiC or the like), a coefficient of friction suddenly rises, so that the head is stuck to the disk or/and the disk is thereby injured. Further, with a recording member that has a PCVD carbonaceous film, for instance, in the case that the film is an amorphous carbon type, the film is so hard that almost the same disadvantage as when the use of the sputter film is brought about, and when the film is a polymeric carbonaceous type it is excellent in lubricating ability or antifriction property, so that its coefficient of friction to the $CaTiO_3$ or $Al_2O_3$, TiC is small, and a sudden rise thereof during its application thereto is not made. But the film is comparatively soft, so that the film is broken and as a result the magnetic film underneath is thereby injured. Thus a tendency to spoil the disk is increased therefore the condition of manufacturing the polymeric type carbonaceous film has to be controlled strictly. Furthermore, the vapor deposition carbon film prepared by the arc discharge has the problem that the coefficient of friction thereof during its application thereto is increased as in the case of use of the sputter carbon film, and besides the adhesion thereof to the magnetic recording film is poor as compared with the sputter carbon film.

SUMMARY OF THE INVENTION

Applicants have discovered an abrasion resistant magnetic recording member free from those defects which plague the foregoing conventional carbonaceous protective films, Specifically, applicants have discovered an abrasion resistant magnetic recording member in which a carbonaceous surfacial protective film is formed on a surface of a magnetic film formed on a surface of nonmagnetic substrate, in which that the carbonaceous surfacial protective film is formed of a lower layer of comparatively hard carbonaceous film and an upper layer of comparatively soft and lubricative carbonaceous film.

One type of the abrasion resistant magnetic recording member of this invention is one in which the lower layer from comparatively hard carbonaceous film is formed of a sputter carbon film, and the upper layer of comparatively soft and lubricative or antifrictional carbonaceous film is formed of a PCVD carbonaceous film. With this type the PCVD carbonaceous film generally contains 6 at.% or more hydrogen atoms fluorine atoms, or a total of both hydrogen atoms and fluroine atoms.

Another embodiment of the foregoing abrasion resistant magnetic recording member of this invention is one in which the lower layer of comparatively hard carbonaceous film comprises a PCVD carbonaceous film containing 5 at.% or less of either hydrogen atoms fluorine atoms or a total of hydrogen atoms and the fluorine atoms, and the upper layer of comparatively soft carbonaceous film comprises a PCVD carbonaceous film containing 6 at.% or more of either hydrogen atoms alone or fluorine atoms alone or of a total of both the hydrogen atoms and the fluorine atoms.

In addition, between the magnetic film and the lower layer of carbonaceous film of the abrasion resistant magnetic recording member of this invention there may be provided an intermediate layer of Cr, Ti, etc. for improving the adhesion of the carbonaceous film to the magnetic film.

DESCRIPTION OF PREFERRED EMBODIMENTS

Examples of this invention will be explained further in detail as follows.

Firstly, as one embodying example of this invention, there will be explained about such a type of an abrasion resistant magnetic recording member having a carbonaceous surfacial protective film in which the lower layer thereof comprises a sputter carbon film and the upper layer thereof comprises a PCVD carbonaceous film.

Embodying Example 1

A deposited magnetic film formed of two layers comprising a Cr layer of 1,000 Å in thickness and a CoNiCr layer of 900 Å in thickness was formed on a substrate of NiP/Al in the form of a disk by a sputtering process, and thereafter, in succession thereto, a deposited sputter carbon film in the range of 100–800 Å in thickness was formed on the magnetic film by a sputtering process using a graphite target. Further a deposited PCVD carbonaceous film composed mainly of carbons and partly carbons combined with hydrogen atoms was formed by an R F charge or a D C charge in an acetylene gas in the range of $1 \times 10^{-2}$–1 Torr, on the surface of the sputter carbon film. In the case of the R F charge, the PCVD process was carried out in the range of 0.001 W/cm²–0.1 W/cm², and in the case of the D C charge, the PCVD process was carried out in the range of $-100$ V $\sim -2,000$ V.

The thickness of the resultant PCVD carbonaceous film was made, in general, in the range of 50–500 Å.

Figure 3:
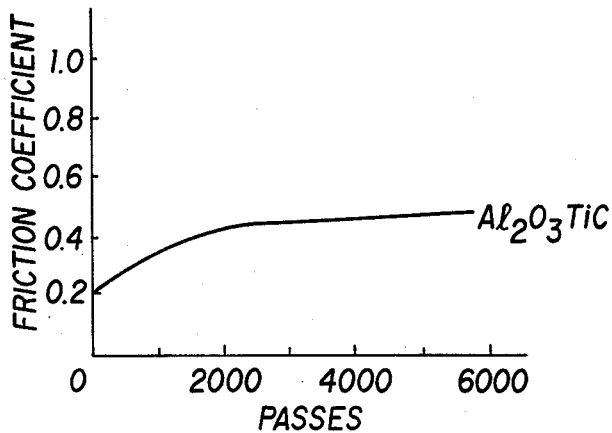
FIG. 3 is a diagram showing the characteristic curve of the coefficient of friction of a magnetic recording member of this invention having one exemplified composite carbonaceous protective film with the head of $Al_2O_3$.TiC, resulting from the abrasion resistance test.

Thus, there was manufactured an abrasion resistant magnetic recording member embodiment of this invention. With respect to this recording member, a abrasion resistance test was carried out in such a manner that this disk type of recording member was rotated at a speed of 45 r.p.m. and was given 5,500 rounds for 2 hours while being applied with a load of 32 g of a 3,370 model head comprising $Al_2O_3.TiC$ continuously for measuring a coefficient of friction. The result thereof is shown in FIG. 3 as one example. This sample was such that the thickness of the sputter carbon film thereof was 200 Å, the thickness of the PCVD carbonaceous film thereof was 300 Å, and the content of hydrogen atoms was 10 at.%. The gaseous pressure of the acetylene gas at the time of manufacturing thereof was 0.4 Torr, and the D C charge was $-800$ V.

As will be clear from FIG. 3, the magnetic recording member of this invention does not make a sharp rise in the coefficient of friction even by applying the $Al_2O_3.TiC$ head thereto, and in addition there hardly were observed tracking traces of the head thereon.

Also, as a result of a C S S (Constant Start and Stop) test, according to the ANSI standard, it has been found that even 15,000 repetitions of the start and stop cycle thereof does not cause anything wrong with the sample and thus it has been confirmed that there can be obtained a surfacial protective film having an excellent abrasion resistance given by a combination of a hardness of the sputter carbon layer and a lubricating ability of the PCVD layer.

Figure 1:
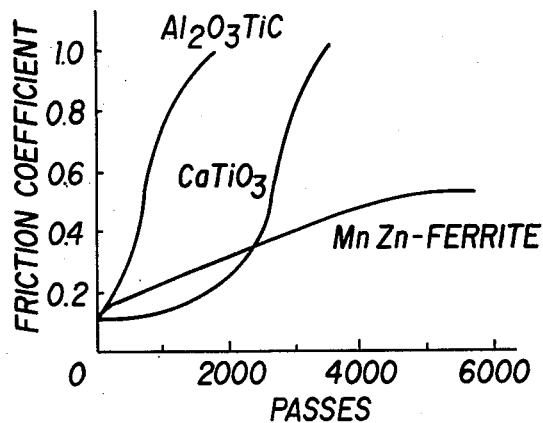
FIG. 1 is a diagram showing characteristic curves of the coefficient of friction of a sputter carbon film with various heads resulting from an abrasion resistance test.
Figure 2:
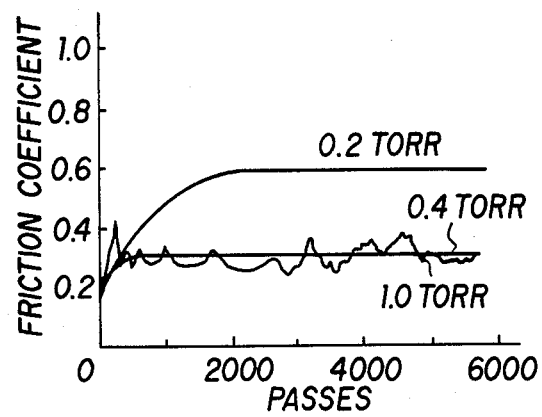
FIG. 2 is a diagram showing the relationship between various characteristic curves of coefficient of friction of various PCVD films with a head of $Al_2O_3$.TiC resulting from the abrasion resistance test and various gaseous pressures used for forming the foregoing PCVD films on the corresponding sputter carbon film.

For comparison, an abrasion resistant magnetic recording member of the disk type prepared by a conventional sputtering process in which a deposited single sputter carbon film of 400 Å in thickness is formed on the surface of the foregoing two-layered deposited magnetic film was put to the foregoing abrasion resistance test in the same manner as above by using the $Al_2O_3.TiC$ head, the $CaTiO_3$ head and the MnZn-ferrite head, respectively. The results thereof are shown in FIG. 1. It has been found therefrom that in the case of a ceramic head such as the $Al_2O_3.TiC$ head or the $CaTiO_3$ head, the coefficient of friction is remarkably increased as the rotation number is increased, resulting in exceeding the value 1. On the other hand, for comparison, various kinds of abrasion resistant magnetic recording members of the disk type were prepared so that a deposited single PCVD carbonaceous film of 400 Å in thickness was formed on the foregoing two-layered deposited magnetic film while under the conditions that the electric discharge condition was kept constant but the gaseous pressure condition of the acetylene gas was varied. Those recording members were put to the foregoing abrasion resistance test in the same manner as above. The results thereof are shown in FIG. 2. As will be clear therefrom, the coefficient of friction is decreased according as the gaseous pressure is increased. However, there is such a tendency that the softer film is made according to the increase in the gaseous pressure, the quicker the disk is injured by such a hard head as the $Al_2O_3.TiC$ one. That is considered to be due to the fact that according as the gaseous pressure is increased, the content of the H—C bonds is increased and thus the formation of the PCVD carbonaceous film which is produced tends to be changed from the amorphous or graphite carbon film through the carbonaceous film containing a small proportion of C—H bonds toward the polymeric type carbonaceous film. From the test results, however, it has been learned that the foregoing trend means that the PCVD carbonaceous member is small in coefficient of friction and shows a lubricating ability or antifriction property.

The magnetic resistance recording member of this invention having the foregoing construction is such that the carbonaceous surfacial protective film thereof is formed of the two layers comprising the deposited sputter carbon film which is high in hardness and the deposited PCVD carbonaceous film which is formed on the sputter carbon film and which is excellent in lubricating ability, so that the hard head of such a ceramic series as $Al_2O_3.TiC$, $CaTiO_3$ etc. can be operated smoothly owing to the fact that the coefficient of friction is small due to the surfacial lubricative property of the PCVD film thereof and even if part of the surfacial protective PCVD film is worn by the head, there exists the sputter carbon film high in hardness underneath the worn part thereof, and consequently the sputter carbon film protects the magnetic film against being injured by the head and at the same time keeps the same from contacting the head additionally the lubricating property of the surface of the recording disk can be well maintained by the major remainder of the PCVD film, and thus a good recording or reproducing operation by the $Al_2O_3.TiC$ head can be carried out over a very long period of time without any remarkable rise in coefficient of friction.

The above advantageous effects can be brought about also in the case of the friction thereof with the $CaTiO_3$ head or other hard kinds of hard heads.

As for the hydrocarbon gas used for producing the PCVD carbonaceous film, there is used, besides the acetylene gas, any other kind of a C—H series gas such as methane gas, ethylene gas, benzene, etc.

Embodying Example 2

There was prepared an abrasion magnetic resistant recording member having an upper layer comprising a deposited PCVD carbonaceous film and a lower layer comprising sputter carbon film under the same conditions as the embodying example 1 except that $CHF_3$ gas was used instead of acetylene gas which was used in the embodying example 1. As a result of the foregoing abrasion resistance test, the same has been found to be so excellent that the coefficient of friction is small and stable for a long period of time similar to that shown in FIG. 3. The thickness of the sputter carbon film of the recording member used for this test was 200 Å, and that of the PCVD carbonaceous film thereof was 300 Å, and the content of the hydrogen atoms and fluorine atoms containing in the PCVD carbonaceous film was 8 at.%. The PCVD carbonaceous film was formed under the condition that the gaseous pressure was 0.3 Torr, and the D C charge was −800 V.

Further, instead of $CHF_3$ gas, various kinds of gas including C and F or C, H and F such as $CF_4$, $CH_2F_2$, $CF_4+H_2$, $CF_4+C_2H_2$, etc. were used selectively and there can be obtained similarly excellent abrasion resistant magnetic recording members.

Thus, there can be manufactured various kinds of PCVD carbonaceous films such as of an amorphous carbon film, a carbonaceous film containing a small proportion of C—H bonds, a carbonaceous film containing a small proportion of C—H bonds and C—F bonds or a polymeric type carbonaceous film containing a comparatively large proportions of C—H bonds or-/and C—F bonds according to various kinds of gases, change in gaseous pressures, or electric discharge conditions, etc. However, there can always be obtained the PCVD carbonaceous film having comparatively soft and lubricative properties by the PCVD process under the conditions of the gaseous pressure is in the range of $1\times10^{-2}-1$ Torr, the charge is in the range of 0.001 $W/cm^2$-0.01 $W/cm^2$, or the D C charge is in the range of −100 V- −2,000 V.

In addition, in order to improve a property of adherence between the magnetic film and the sputter carbon film, there may be interposed therebetween a deposited intermediate layer of Cr, Ti, etc.

Thus, according to this invention, the film for protecting the surface of the magnetic film is formed of the upper layer comprising the PCVD carbonaceous film and the lower layer comprising the sputter carbon film, so that there is brought about such an advantage that there can be obtained an abrasion resistant magnetic recording member which is suitably applicable to the foregoing hard type head to which the conventional type of abrasion resistant magnetic recording member having a single layer of the PCVD carbonaceous film alone or of the sputter carbon film alone was inapplicable, and which is small in coefficient of friction and stable during a long period of use thereof.

Next, there will be explained in detail another embodying example if an abrasion resistant magnetic recording member having a carbonaceous surficial protective film formed of a lower layer comprising a comparatively hard PCVD carbonaceous film and an upper layer comprising comparatively soft and lubricative PCVD carbonaceous film.

In the case of forming a carbonaceous film on a magnetic film by the PCVD process, it has been confirmed, in general, from many experiments that, depending on the kind of gas such as a hydrocarbon series gas or carbon fluoride series gas, or a mixture gas thereof introduced into a treating chamber, change in a gaseous pressure thereof, or change in electric voltage of a discharge of R F or D C, or the like, there are obtained various products which are different in such properties of the carbonaceous films as hardness, coefficient of friction, lubricating ability and the like thereof. On this occasion, there has been studied the relations between the manufacturing conditions for obtaining such a hard PCVD carbonaceous film that is injured by a slider of a hard head made of such ceramics as $Al_2O_3.TiC$ or the like, and for obtaining such a PCVD carbonaceous film that has softness and lubricating ability, and the content of hydrogen atoms alone or fluorine atoms alone or a total content of both the hydrogen atoms and fluorine atoms which are contained, respectively, in the PCVD carbonaceous films. As a result thereof, it has been found that the foregoing hard PCVD carbonaceous film can be obtained by containing therein 5 at.% or less of hydrogen atoms alone, or fluorine atoms alone or of hydrogen atoms and fluorine atoms in total, and that the foregoing soft and lubricative PCVD carbonaceous film can be obtained by containing 6 at.% or more of hydrogen atoms alone, of fluorine atoms alone or of hydrogen atoms and fluorine atoms in total, and, based on the foregoing findings, there has been established the present invention in which a carbonaceous surficial protective film is formed of two layers of which a lower one is constructed by the latter film of hard type and an upper one is constructed by the former film of soft type, and thereby there can be removed for foregoing defects with the conventional abrasion resistant magnetic recording member having the single film comprising either the sputter carbon film alone or the PCVD carbonaceous film alone, and there can be obtained an abrasion resistant magnetic recording member which is comparatively small in coefficient of friction and is large in service life, as explained thereafter.

Embodying Example 3

There were produced many magnetic recording mediums of hard type disks each prepared in such a manner that a deposited magnetic film formed of two layers comprising CoNiCr and Cr is formed by a sputtering process on the surface of a NiP/Al hard disk. Thereafter, those disks were treated with a PCVD process using a D C discharge and three kinds of gases, viz., $C_2H_2$ gas, $C_3F_8$ gas and a mixture of 70% $C_2H_2$ + 30% $C_3F_8$ gases. On this occasion, the pressure of an introduced gas was in the range of $1\times10^{-2}-1$ Torr, and an electric voltage of D C charge was in the range of −100-3,000 V, and either one or both of the values of the gas pressure and those of the electric voltage were changed variously, so that there were produced various abrasion resistant magnetic recording members of hard disk type which are different in content of H atoms alone, F atoms alone or a total of H and F atoms which are contained in the respective films. In regard to those disks, the relations between the atomic content and the coefficient of friction of the carbonaceous films were measured. Determination of content of H or F atoms was obtained from absorption spectrum resulted from the C—H bonds and C—F bonds by an infrared absorbing analysis method.

Evaluation of the coefficient of friction was made from the results of such an abrasion resistance testing method in which respective disks were rotated at a speed of 45 r.p.m., and under application of 32 g load of the head of 3,370 model using an $Al_2O_3.TiC$ slider of a hard head, and the coefficient of friction was measured continuously up to 5,500 repititions (2 hours). In addition, regarding those disks, the C S S test was carried out. In this case, the thicknesses of the formed films of the respective disks used for the test were all 600 Å. The results thereof were shown in Table 1, Table 2 and Table 3.

TABLE 1

| Sample No. | Hydrogen content (at. %) | State after 5,500 rounds in abrasion resistance test | | C S S test |
|---|---|---|---|---|
| | | Coefficient of friction | Disk surface | |
| 1 | 2 | >1.5 | Nothing changed | Stuck after 100 rounds |
| 2 | 5 | >1.5 | Nothing changed | Stuck after 500 rounds |
| 3 | 8 | 0.75 | Scratches | Scratches got after 1,000 rounds |
| 4 | 15 | 0.45 | " | Scratches got after 1,000 rounds |
| 5 | 27 | 0.33 | " | Scratches got after 1,000 rounds |
| 6 | 40 | 0.41 | " | Scratches got after 100 rounds |

TABLE 2

| Sample No. | Fluorine content (at. %) | State after 5,500 rounds in abrasion resistance test | | C S S test |
|---|---|---|---|---|
| | | Coefficient of friction | Disk surface | |
| 7 | 3 | >1.5 | Nothing changed | Stuck after 500 rounds |
| 8 | 5 | >1.5 | Nothing changed | Stuck after 1,000 rounds |
| 9 | 7 | 0.68 | Scratches | Scratches got after 1,000 rounds |
| 10 | 11 | 0.55 | " | Scratches got after 1,000 rounds |
| 11 | 20 | 0.35 | " | Scratches got after 500 rounds |
| 12 | 35 | 0.43 | " | Scratches got after 500 rounds |

TABLE 3

| Sample No. | Hydrogen content (at. %) | Fluorine content (at. %) | Hydrogen + Fluorine content in total (at. %) | State after 5,500 rounds in abrasion resistance test | | CSS test |
|---|---|---|---|---|---|---|
| | | | | Coefficient of friction | Disk surface | |
| 13 | 2 | 1 | 3 | >1.5 | Nothing changed | Stuck after 1,000 rounds |
| 14 | 2 | 2 | 4 | >1.5 | Nothing changed | Stuck after 1,000 rounds |
| 15 | 4 | 2 | 6 | 0.65 | Scratches | Scratches got after 1,000 rounds |
| 16 | 10 | 8 | 18 | 0.35 | " | Scratches got after 1,000 rounds |

Thus, it has been confirmed that, as will be clear from the Table 1, Table 2 and Table 3, in the case where the content of H alone or F alone or the total contents of H and F is 5 at.% or less, there can be obtained such a hard carbonaceous film that is high in coefficient of friction and is so hard that the surface thereof is not scratched at all and in the case where the content of H alone or F alone or the total contents of H and F is 6 at.% or more, thee can be obtained such a soft carbonaceous film that is low in coefficient of friction but is so soft that the surface thereof is scratched with the hard slider of the head.

According to this invention, the difference in the hardness and coefficient of friction of those carbonaceous films are made use of so skillfully that those different carbonaceous films are put one upon another in two layers so as to protect the surface of the magnetic film, and provide an abrasion resistant magnetic recording member which is applicable in a smooth and good condition to the foregoing ceramic slider with the surface of the magnetic film not being scratched therewith, and according to this invention, it is characterized in that the surface of a magnetic film is covered with a carbonaceous surfacial protective film formed of a lower layer comprising a carbonaceous film containing 5 at.% or less of hydrogen atoms alone or fluorine atoms alone or both of hydrogen atoms and fluorine atoms in total, and upper layer comprising a carbonaceous film containing 6 at.% or more of H atoms alone or F atoms alone or both the H and F atoms in total, so that the foregoing excellent abrasion resistant magnetic recording member can be realized. The results of the abrasion resistance test and the C S S test on some embodying examples of this invention are shown in Table 4 described below.

TABLE 4

| Sample No. | Hydrogen, fluorine content (at. %) | | Condition after 5,500 round in acceleration test | | C S S test |
|---|---|---|---|---|---|
| | | | Coefficient of friction | Disk surface | |
| 17 | Lower layer | 2 at. % H | 0.48 | Nothing changed | above thirty thousand (30,000) times |
| | Upper layer | 15 at. % H | | | |
| 18 | Lower layer | 5 at. % H | 0.36 | Nothing changed | above thirty thousand (30,000) times |
| | Upper layer | 27 at. % H | | | |
| 19 | Lower layer | 3 at. % F | 0.55 | Nothing changed | above thirty thousand (30,000) times |
| | Upper layer | 11 at. % F | | | |
| 20 | Lower layer | 2 at. % H + 2 at. % F | 0.40 | Nothing changed | above thirty thousand (30,000) |
| | Upper layer | 10 at. % H + | | | |

TABLE 4-continued

| Sample No. | Hydrogen, fluorine content (at. %) | | Condition after 5,500 round in acceleration test | | C S S test |
|---|---|---|---|---|---|
| | | | Coefficient of friction | Disk surface | |
| 21 | Lower layer | 8 at. % F 2 at. % H + 1 at. % F | 0.60 | Nothing changed | times above thirty thousand (30,000) times |
| | Upper layer | 4 at. % H + 2 at. % F | | | |

The Table 4 shows that the foregoing embodying examples are all small in coefficient of friction and are not scratched at all and in addition have remarkable abrasion resistances as high as several ten thousands in the C S S test. In those examples used for the above tests, the thicknesses of the upper and lower carbonaceous layers of the protective film of each thereof were 300 Å, respectively.

The foregoing effects are considered to be due to the facts that the coefficient of friction of the protective film with the hard slider of the head can be kept small by the soft and lubricative carbonaceous upper layer thereof, which means that the soft carbonaceous upper layer has a lubricating ability, so that the hard carbonaceous lower layer thereof is always given the lubrication property by the soft and lubricative carbonaceous upper layer, and thereby even if the hard slider should pass through the part of the upper layer to reach the surface of the hard lower layer, the coefficient of friction can be kept small for a long period of time, and meanwhile the hard lower layer can protect the magnetic film against being injured by the hard slider, and thus, after all, by cooperation of the soft upper layer and the hard lower layer, there can be obtained the foregoing several tens of thousands repititions in the C S S test.

In order to obtain the carbonaceous lower layer containing 5 at.% or less of hydrogen atoms alone, fluorine atoms alone or a mixture thereof as shown in Table 4, for instance, the gas pressure introduced into the PCVD treating chamber was set to be $1 \times 10^{-2}$ Torr or so. In order to obtain the soft carbonaceous layer containing 6 at.% or more thereof, the gas pressure was set to be $1 \times 10^{-1}$ Torr or so. However, the condition of gas pressure are not limited thereto. As for the hydrocarbon series gas and the fluorinated hydrocarbon series gas or the fluorocarbon series gas, there may be used other desired gases than the gases used in the foregoing embodying examples. As for the type of the disks, there may be used a flexible disk, a tape or other desired shape or material made substrate than the hard disk used for producing the foregoing embodying examples. For the electric discharges, there is effectively used a microwave type discharge or the like other than the R F, D C type discharges.

The carbonaceous protective film comprising the upper and lower carbonaceous layers of this invention may be formed on the surface of the magnetic film not only directly, but also indirectly through an intermediate layer of any kind material such as $SiC_2$, BN, B, Cr, etc.

Thus, according to this invention, an abrasion resistant magnetic recording member is so formed that a surface of a magnetic film thereof is protected with a carbonaceous protective film formed of two layers comprising a lower layer of a hard carbonaceous film containing 5 at.% or less of H atoms or F atoms or a mixture thereof and an upper layer of a soft and lubricative carbonaceous film containing 6 at.% or more of H atoms or F atoms of a mixture thereof, so that the same is adaptable for a head having a hard slider such as a monothilic head made of $CaTiO_3$ or the like, and can be used for a long time.

What is claimed is:

1. An abrasion resistant magnetic recording member comprising a carbonaceous surfacial protective film formed on a surface of a magnetic film formed on a surface of a nonmagnetic substrate, wherein the carbonaceous surfacial protective film has a lower layer of comparatively hard carbonaceous film and an upper layer of comparatively soft and lubricative carbonaceous film, said protective film either being formed through an intermediate layer on the surface of the magnetic film or being formed, by a method other than arc deposition, directly on the surface of the magnetic film, wherein the lower layer contains 5 at.% or less of hydrogen, fluorine, or a combination of hydrogen and fluorine, and wherein the upper layer contains 6 at.% or more of hydrogen, fluorine, or a combination of hydrogen and fluorine.

2. An abrasion resistant magnetic recording member claimed in claim 1, wherein the lower layer of comparatively hard carbonaceous film comprises a sputter carbon film, and the upper layer of comparatively soft and lubricative carbonaceous film comprises a PCVD carbonaceous film.

3. An abrasion resistant magnetic recording member claimed in claim 2, wherein the PCVD carbonaceous film contains 6 at.% or more of hydrogen atoms.

4. An abrasion resistant magnetic recording member claimed in claim 2, wherein the PCVD carbonaceous film contains 6 at.% or more of fluorine atoms.

5. An abrasion resistant magnetic recording member claimed in claim 2, wherein the PCVD carbonaceous film contains 6 at.% or more of a total of hydrogen atoms and fluorine atoms.

6. An abrasion resistant magnetic recording member claimed in claim 1, wherein the lower layer of comparatively hard carbonaceous film comprises a PCVD carbonaceous film containing 5 at.% or less of hydrogen atoms, and the upper layer of comparatively soft carbonaceous film comprises a PCVD carbonaceous film containing 6 at.% or more of hydrogen atoms.

7. An abrasion resistant magnetic recording member claimed in claim 1, wherein the lower layer of comparatively hard carbonaceous film comprises a PCVD carbonaceous film containing 5 at.% or less of fluorine atoms, and the upper layer of comparatively soft carbonaceous film comprises a PCVD carbonaceous film containing 6 at.% or more of fluorine atoms.

8. An abrasion resistant magnetic recording member claimed in claim 1, wherein the lower layer of comparatively hard carbonaceous film comprises a PCVD carbonaceous film containing 5 at.% or less of a total of hydrogen atoms and fluorine atoms, and the upper layer of comparatively soft carbonaceous film comprises a PCVD carbonaceous film containing 6 at.% or more of a total of hydrogen atoms and fluorine atoms.

* * * * *